United States Patent [19]
Kashepava

[11] Patent Number: 5,793,854
[45] Date of Patent: Aug. 11, 1998

[54] SYSTEM FOR SELECTION AND MONITORING TELEPHONE RATES

[76] Inventor: Leonid Kashepava, 178 Ocean Pkwy. E2, Brooklyn, N.Y. 11218

[21] Appl. No.: 712,306

[22] Filed: Sep. 11, 1996

[51] Int. Cl.$^6$ .................................................. H04M 15/00
[52] U.S. Cl. .................. 379/130; 379/111; 379/114; 379/140; 379/128
[58] Field of Search .................. 379/111, 112, 379/114, 116, 130, 131, 143, 144, 199, 201, 204, 206, 140, 141

[56] References Cited

U.S. PATENT DOCUMENTS

| | | | |
|---|---|---|---|
| 4,485,904 | 12/1984 | Mincone et al. | 379/114 |
| 5,425,085 | 6/1995 | Weinberger et al. | 379/114 |
| 5,519,769 | 5/1996 | Weinberger et al. | 379/114 |
| 5,553,124 | 9/1996 | Brinskele | 379/114 |
| 5,608,788 | 3/1997 | Demlow et al. | 379/118 |

*Primary Examiner*—Curtis Kuntz
*Assistant Examiner*—Binh K. Tieu

[57] ABSTRACT

A system for selecting and monitoring telephone rates including a telephone hand-set with a numeric keypad and a plurality of scroll keys and an enter key situated thereon. A modem is adapted to receive and download from a database information including a rate of charge for a long distance call made at the time of the download for a plurality of telecommunication companies. Also included is a monitor for viewing such data. Finally, control circuitry is connected to the modem, telephone handset, and monitor. The control circuitry is adapted to display on the monitor a time and a date of the most recent downloading of information, the rate of charge for a long distance call made at the time of the download for each telecommunication company, and the current monthly subtotal due to each telecommunication company. The control circuitry is further adapted to allow the selection of one of the telecommunication companies for a current long distance telephone call via the scroll keys and enter key.

9 Claims, 2 Drawing Sheets

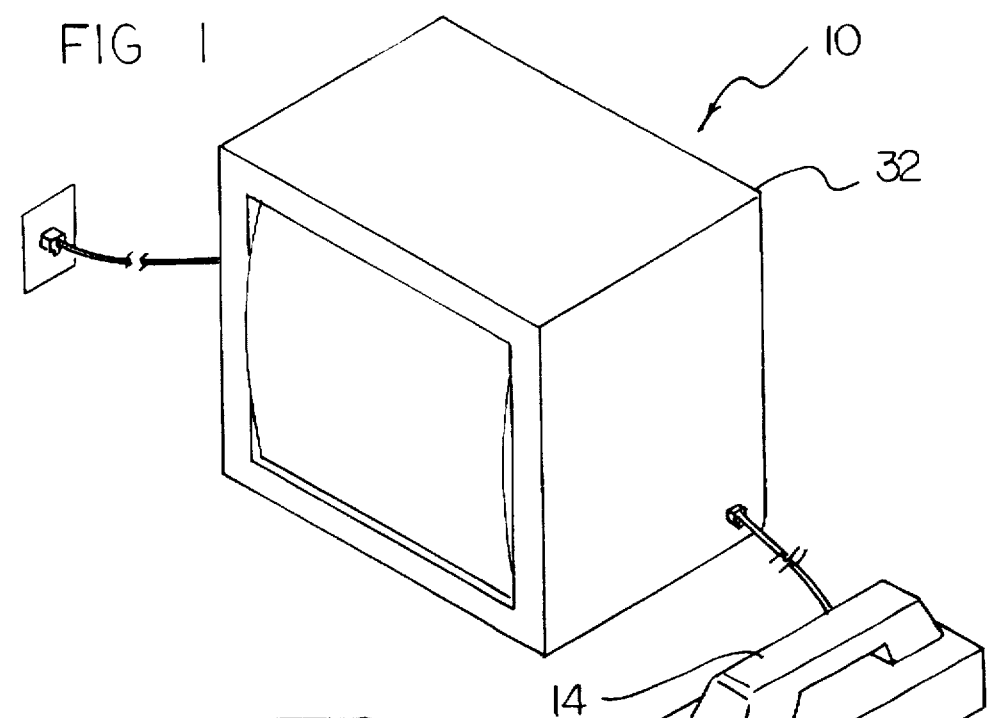
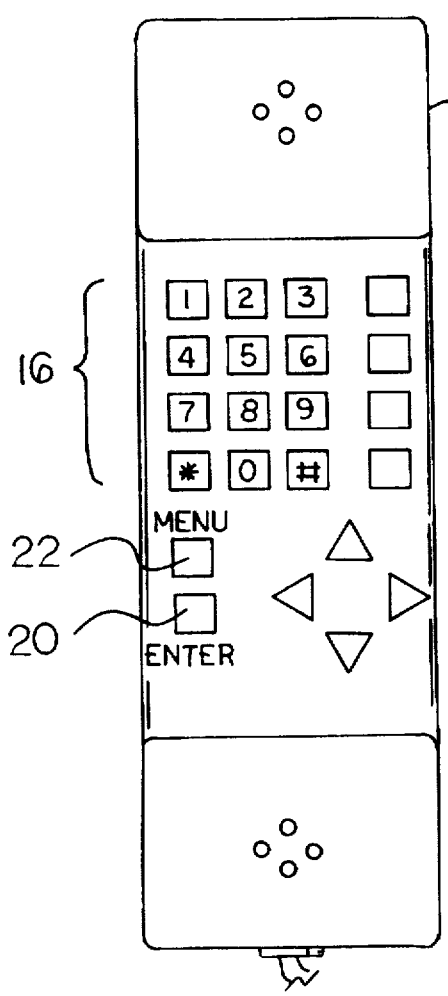
FIG 1
FIG 2

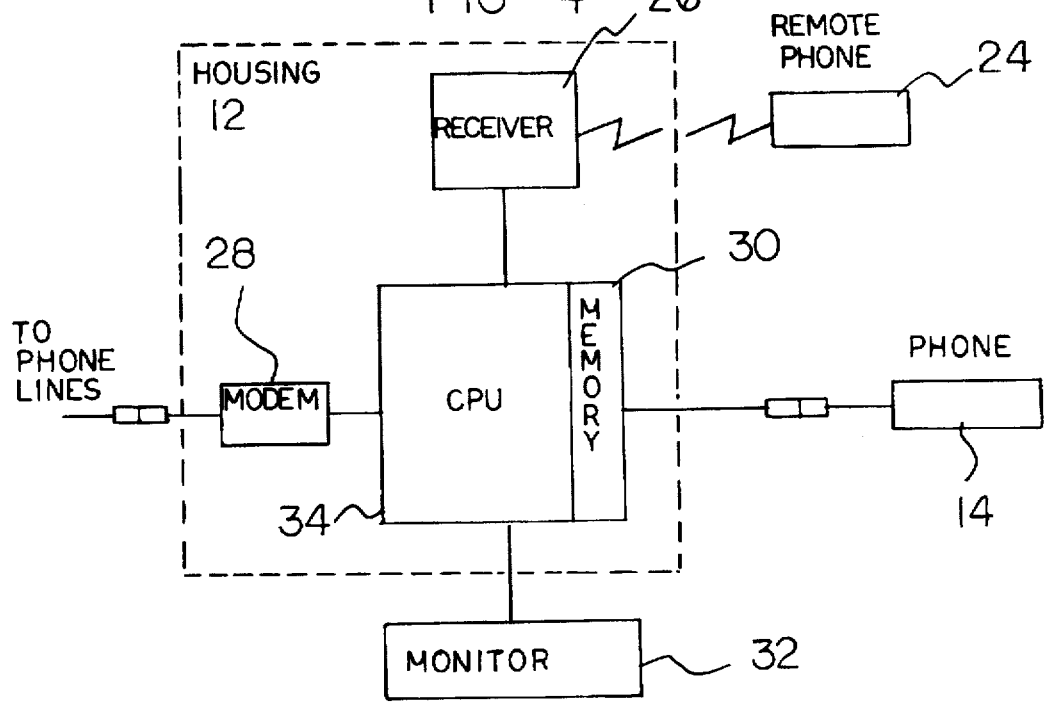

5,793,854

1

SYSTEM FOR SELECTION AND MONITORING TELEPHONE RATES

BACKGROUND OF THE INVENTION

1. Field of the Invention

The present invention relates to a system for selecting and monitoring telephone rates and more particularly pertains to conveniently saving money on long-distance telephone calls.

2. Description of the Prior Art

The use of telephone metering devices is known in the prior art. More specifically, telephone metering devices heretofore devised and utilized for the purpose of monitoring the rates of telephone calls are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,920,562 to Hird et al. a telephone system having a microprocessor control system for automatically calling a party long distance. U.S. Pat. No. 4,264,956 to Delaney discloses a call cost monitor to enable the user of a telephone to monitor accurately the cost of outgoing phone calls. U.S. Pat. No. 4,585,904 to Mincone et al. discloses a programmable computerized telephone call cost metering device. U.S. Pat. No. 4,459,432 to Hashimoto; U.S. Pat. No. 4,122,308 to Weinberger et al.; and U.S. Pat. No. 4,041,291 to Pavda are provided as being of general interest.

In this respect, the system for selecting and monitoring telephone rates according to the present invention substantially departs from the conventional concepts and designs of the prior art, and in so doing provides an apparatus primarily developed for the purpose of conveniently saving money on long-distance telephone calls.

Therefore, it can be appreciated that there exists a continuing need for a new and improved system for selecting and monitoring telephone rates which can be used for conveniently saving money on long-distance telephone calls. In this regard, the present invention substantially fulfills this need.

SUMMARY OF THE INVENTION

In view of the foregoing disadvantages inherent in the known types of telephone metering devices now present in the prior art, the present invention provides an improved system for selecting and monitoring telephone rates. As such, the general purpose of the present invention, which will be described subsequently in greater detail, is to provide a new and improved system for selecting and monitoring telephone rates which has all the advantages of the prior art and none of the disadvantages.

To attain this, the present invention essentially comprises a housing with a generally rectangular configuration having a top face, a bottom face, and a periphery formed therebetween defining an interior space. Also included is a stationary telephone hand-set positioned on the top surface of the housing. The telephone has a numeric keypad, a plurality of scroll keys, an enter key, and a menu key situated thereon. As shown in FIG. 4, a mobile telephone hand-set is included having a numeric keypad, a plurality of scroll keys, an enter key, and a menu key situated thereon. Associated with the mobile telephone hand-set is a mobile telephone receiver situated within the interior space of the housing. The mobile telephone receiver is adapted to communicate via free space with the mobile telephone handset for the remote operation thereof. A modem is situated within the interior space of the housing and is adapted to automatically connect via a telephone line to a data base generated by a plurality of telecommunication companies upon the depression of a menu key of the numeric keypad. To access a personal file of a user, an encrypted access code is automatically transmitted to the database. The modem is further adapted to receive and download from the database information including a rate of charge for a long distance call made at the time of the download for each telecommunication company and a current monthly subtotal due to each telecommunication company. Memory is situated within the interior space of the housing and is adapted to store the information received via the modem therein upon downloading. For viewing purposes, a monitor in the form of a standard television set is included. Finally, control circuitry is situated within the interior space of the housing and connected to the modem, memory, telephone handset, mobile telephone receiver, and monitor. The control circuitry is adapted to display on the monitor a time and a date of the most recent downloading of information, a rate of charge for a long distance call made at the time of the download for each telecommunication company, and the current monthly subtotal due to each telecommunication company. The control circuitry is also adapted to calculate a current monthly total due to all of the companies and further display the current monthly total on the monitor. For allowing the selection of one of the telecommunication companies for a current long distance telephone, the user may employ the combination of scroll keys and enter key. With such a structure, a user may employ the telephone handset for stationary use of the present apparatus or the mobile telephone handset for remote use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved system for selecting and monitoring telephone rates which has all the advantages of the prior art telephone metering devices and none of the disadvantages.

It is another object of the present invention to provide a new and improved system for selecting and monitoring telephone rates which may be easily and efficiently manufactured and marketed.

It is a further object of the present invention to provide a new and improved system for selecting and monitoring telephone rates which is of a durable and reliable construction.

An even further object of the present invention is to provide a new and improved system for selecting and monitoring telephone rates which is susceptible of a low cost of manufacture with regard to both materials and labor, and which accordingly is then susceptible of low prices of sale to the consuming public, thereby making such system for selecting and monitoring telephone rates economically available to the buying public.

Still yet another object of the present invention is to provide a new and improved system for selecting and monitoring telephone rates which provides in the apparatuses and methods of the prior art some of the advantages thereof, while simultaneously overcoming some of the disadvantages normally associated therewith.

Still another object of the present invention is to conveniently save money on long-distance telephone calls.

Lastly, it is an object of the present invention to provide a new and improved system for selecting and monitoring telephone rates including a telephone hand-set with a numeric keypad and a plurality of scroll keys and an enter key situated thereon. A modem is adapted to receive and download from a database information including a rate of charge for a long distance call made at the time of the download for a plurality of telecommunication companies. Also included is a monitor for viewing such data. Finally, control circuitry is connected to the modem, telephone handset, and monitor. The control circuitry is adapted to display on the monitor a time and a date of the most recent downloading of information, the rate of charge for a long distance call made at the time of the download for each telecommunication company, and the current monthly subtotal due to each telecommunication company. The control circuitry is further adapted to allow the selection of one of the telecommunication companies for a current long distance telephone call via the scroll keys and enter key.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the system for selecting and monitoring telephone rates constructed in accordance with the principles of the present invention.

FIG. 2 is an elevational view of the handset and the keys associated therewith.

FIG. 3 is a plan front view of the monitor depicting the second screen thereof.

FIG. 4 is a schematic diagram showing the interconnection of the electrical components employed in the present invention.

Similar reference characters refer to similar parts throughout the several views of the drawings.

DESCRIPTION OF THE PREFERRED EMBODIMENT

With reference now to the drawings, and in particular to FIG. 1 thereof, a new and improved system for selecting and monitoring telephone rates embodying the principles and concepts of the present invention and generally designated by the reference numeral 10 will be described.

The present invention, the new and improved system for selecting and monitoring telephone rates, is comprised of a plurality of components. Such components in their broadest context include a housing, stationary phone, mobile phone, mobile phone receiver, modem, memory, monitor, and control circuitry. Each of the components are individually configured and correlated with respect to each other so as to attain the desired objective.

More specifically, it will be noted that the system 10 of the present invention includes a housing 12 with a generally rectangular configuration having a top face, a bottom face, and a periphery formed therebetween defining an interior space.

Also included is a stationary telephone hand-set 14 positioned on the top surface of the housing. The telephone has a numeric keypad 16, a plurality of scroll keys 18, an enter key 20, and a menu key 22 situated thereon.

As shown in FIG. 4, a mobile telephone hand-set 24 is included having a numeric pad, a plurality of scroll keys, an enter key, and a menu key situated thereon similar to that of the stationary telephone hand-set.

Associated with the mobile telephone hand-set is a mobile telephone receiver 26 situated within the interior space of the housing. The mobile telephone receiver is adapted to communicate via free space with the mobile telephone handset for the remote operation thereof.

A modem 28 is situated within the interior space of the housing and is adapted to automatically connect via a telephone line to a data base generated by a plurality of telecommunication companies upon the depression of the menu key of the numeric keypad. To access a personal file of a user, an encrypted access code is automatically transmitted to the database. The modem is further adapted to receive and download from the database information including a rate of charge for a long distance call made at the time of the download for each telecommunication company, a current monthly subtotal due to each telecommunication company, and information pertinent to calls made during the present month.

Memory 30 is situated within the interior space of the housing and is adapted to store the information received via the modem therein upon downloading.

For viewing purposes, a monitor 32 in the form of a standard television set is included.

Finally, control circuitry 34 is situated within the interior space of the housing and connected to the modem, memory, telephone handset, mobile telephone receiver, and monitor. Upon downloading, the control circuitry is adapted to display on the monitor a first screen showing a time and a date of the most recent downloading of information, a rate of charge for a long distance call made at the time of the download for each telecommunication company, and the current monthly subtotal due to each telecommunication company. The control circuitry calculates a current monthly total due to all of the companies and further displays the current monthly total on the monitor. For allowing the selection of one of the telecommunication companies for a current long distance telephone, the user may employ the combination of scroll keys and enter key.

Upon selecting a carrier and dialing a number or a subsequent depression of the menu key, the control circuitry, as shown in FIG. 3, allows the monitor to display a second screen listing the information pertinent to calls made during the current month. Such information includes the carrier, rate, duration, and total of each call. To afford such information, the control circuitry is adapted to track time and calculate and display via the monitor a current running total of the duration and charge for a current call. During a call, the control circuitry continuously updates the current monthly subtotal due to the telecommunication company providing the present call and further updates the current monthly total. The information further includes the foregoing specific data concerning previous calls made during the present month. The information concerning the current call is listed below all of the preceding calls. The scroll keys may be utilized in order to view all of the monthly calls if they do not all fit on the monitor. The user of the present invention may employ the telephone handset for stationary use of the present apparatus or the mobile telephone handset for the remote use thereof.

In an alternate embodiment, a disk drive is connected to the control circuitry and adapted to allow the recording of the information depicted on the monitor.

The information then may be entered within a local database on a conventional computer or printed at the discretion of the user in order to inventory and manage the money spent on long-distance calls.

In use, a caller may press the menu key to effect the dialing and connecting with the data base. After the appropriate information is downloaded, a user may view a first screen of information including the time and date of the most recent downloading of information, a rate of charge for a long distance call made at the time of the download for each telecommunication company, the current monthly subtotal due to each telecommunication company, and a current monthly total due to all of the companies. Before making a selection of a long-distance carrier and actually dialling a number, the menu key may be depressed again to view a second screen depicting the list of calls made in the present month with information pertinent thereto. To return to the first screen, the caller is merely required to depress the menu key again. If a call is made, the control monitor automatically displays the second screen which lists the carrier, rate, running duration, and running total of the present call. During a present call, the monitor is adapted to toggle between the first screen and second screen via the depression of the menu key. The present invention thus offers significant savings on long-distance calls.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved system for selecting and monitoring telephone rates comprising, in combination:

a housing with a generally rectangular configuration having a top face, a bottom face, and a periphery formed therebetween defining an interior space;

a stationary telephone hand-set positioned on the top surface of the housing, the telephone having a numeric keypad, a plurality of scroll keys, an enter key, and a menu key situated thereon;

a mobile telephone hand-set positioned on the top surface of the housing, the telephone having a numeric keypad, a plurality of scroll keys, an enter key, and a menu key situated thereon;

a mobile telephone receiver situated within the interior space of the housing and adapted to communicate via free space with the mobile telephone handset for the remote operation thereof;

a modem situated within the interior space of the housing and adapted to automatically connect via a telephone line to a data base generated by a plurality of telecommunication companies upon the depression of a menu key of the numeric keypad and the automatic transmission of an encrypted access code thereto, the modem further adapted to receive and download from the database information including a rate of charge for a long distance call made at the time of the download for each telecommunication company and a current monthly subtotal due to each telecommunication company;

memory situated within the interior space of the housing and adapted to store the information received via the modem therein upon the downloading thereof;

monitor for viewing data; and control circuitry situated within the interior space of the housing and connected to the modem, memory, telephone handset, mobile telephone receiver, and monitor, the control circuitry adapted to display on the monitor a time and a date of the most recent downloading of information, the rate of charge for a long distance call made at the time of the download for each telecommunication company, and the current monthly subtotal due to each telecommunication company, the control circuitry adapted to calculate a current monthly total due to all of the companies and further display the current monthly total on the monitor, the control circuitry further adapted to allow the selection of one of the telecommunication companies for a current long distance telephone call via the scroll keys and enter key, whereby a user may employ the telephone handset for stationary use of the present apparatus and the mobile telephone handset for the remote use thereof.

2. A system for selecting and monitoring telephone rates comprising:

a housing with a generally rectangular configuration having a top face, a bottom face, and a periphery formed therebetween defining an interior space;

a stationary telephone hand-set positioned on the top surface of the housing, the telephone having a numeric keypad, a plurality of scroll keys and an enter key situated thereon;

a modem situated within the interior space of the housing and adapted to automatically connect via a telephone line to a data base generated by a plurality of telecommunication companies, the modem further adapted to receive and download from the database information including a rate of charge for a long distance call made at the time of the download for each telecommunication company and a current monthly subtotal due to each telecommunication company;

memory situated within the interior space of the housing and adapted to store the information received via the modem therein upon downloading;

monitor for viewing data; and control circuitry situated within the interior space of the housing and connected to the modem, memory, telephone handset, and monitor, the control circuitry adapted to display on the monitor a time and a date of the most recent downloading of information, the rate of charge for a long distance call made at the time of the download for each telecommunication company, and the current monthly subtotal due to each telecommunication company, the control circuitry further adapted to allow the selection of one of the telecommunication companies for a current long distance telephone call via the scroll keys and enter key, whereby a user may employ the telephone handset for stationary use of the present apparatus.

3. A system for selecting and monitoring telephone rates as set forth in claim 2 wherein the control circuitry is adapted to calculate a current monthly total due to all of the companies and further display the current monthly total on the monitor.

4. A system for selecting and monitoring telephone rates as set forth in claim 2 wherein the control circuitry is adapted to track time and calculate a current running total duration and charge for a current call.

5. A system for selecting and monitoring telephone rates as set forth in claim 4 wherein the control circuitry is adapted to continuously update and display the current monthly subtotal due to each telecommunication company and the current monthly total due to all of the companies.

6. A system for selecting and monitoring telephone rates as set forth in claim 2 and further comprising:

a mobile telephone hand-set positioned on the top surface of the housing, the telephone having a numeric keypad, a plurality of scroll keys and an enter key situated thereon; and a mobile telephone receiver situated within the interior space of the housing and adapted to communicate via free space with the mobile telephone handset for the remote operation thereof.

7. A system for selecting and monitoring telephone rates as set forth in claim 2 wherein the modem is adapted to connect to the data base upon the depression of a menu key.

8. A system for selecting and monitoring telephone rates as set forth in claim 2 wherein the modem is adapted to transmit an encrypted access code to the database thus identifying user.

9. A system for selecting and monitoring telephone rates as set forth in claim 2 and further comprising a disk drive connected to the control circuitry adapted to allow the recording of the information depicted on the monitor.

* * * * *